(12) United States Patent
Grunin et al.

(10) Patent No.: US 9,866,562 B2
(45) Date of Patent: *Jan. 9, 2018

(54) FILE AND BIT LOCATION AUTHENTICATION

(71) Applicant: International Business Machines Corporation, Armonk, NY (US)

(72) Inventors: Galina Grunin, Briarcliff Manor, NY (US); David E. Nachman, Morristown, NJ (US); Nader M. Nassar, Yorktown Heights, NY (US); Tamer M. Nassar, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,070

(22) Filed: Feb. 15, 2017

(65) Prior Publication Data

US 2017/0163648 A1 Jun. 8, 2017

Related U.S. Application Data

(63) Continuation of application No. 14/658,526, filed on Mar. 16, 2015.

(51) Int. Cl.
*G06F 7/04* (2006.01)
*H04L 29/06* (2006.01)
*G06F 15/16* (2006.01)

(52) U.S. Cl.
CPC .......... *H04L 63/10* (2013.01); *H04L 63/0853* (2013.01); *H04L 63/0876* (2013.01)

(58) Field of Classification Search
CPC ............ H04L 63/0869; H04L 63/1441; H04L 63/1466; H04L 63/1483; G06F 21/31;
(Continued)

(56) References Cited

U.S. PATENT DOCUMENTS

| 7,117,528 B1* | 10/2006 | Hyman | H04L 63/08 709/206 |
| 7,480,805 B1* | 1/2009 | Gnech | G06F 21/31 713/182 |

(Continued)

OTHER PUBLICATIONS

Harkins, et al., "Extensible Authentication Protocol (EAP) Authentication Using Only a Password (RFC5931)", An IP.com Prior Art Database Technical Disclosure, Publication Date: Aug. 1, 2010, IP.com No. 000198642, copyright (c) 2010, <http://null/IPCOM/000198642>.

(Continued)

*Primary Examiner* — Gary Gracia
(74) *Attorney, Agent, or Firm* — Khyle J. Eaton; Brian M. Restauro

(57) ABSTRACT

An approach for authentication is provided. The approach performs identifying, by one or more computer processors, an account attempting to access content. The approach performs identifying, by one or more computer processors, a file including at least authentication information. The approach performs identifying, by one or more computer processors, a location of the authentication information within the identified file. The approach performs identifying, by one or more computer processors, a length of the authentication information. The approach performs identifying, by one or more computer processors, the authentication information in the identified file based at least on the identified location and the identified length of the authentication information. The approach performs includes determining, by one or more computer processors, whether the identified authentication information matches previously submitted authentication information for the identified account attempting to access content requiring authentication.

14 Claims, 4 Drawing Sheets

(58) Field of Classification Search
CPC .......... G06F 21/46; G06F 21/42; G06F 3/023; G06F 21/602; G06F 21/84
USPC ............. 705/64, 70, 72; 726/5, 6, 7, 18, 19; 713/181, 183, 184
See application file for complete search history.

(56) References Cited

U.S. PATENT DOCUMENTS

| | | | | |
|---|---|---|---|---|
| 7,660,801 | B2 * | 2/2010 | Muno | G06F 17/3061 707/752 |
| 8,068,474 | B2 * | 11/2011 | Ferguson | G11B 20/1833 370/342 |
| 8,489,882 | B2 | 7/2013 | Killian et al. | |
| 8,683,232 | B2 | 3/2014 | Yuen et al. | |
| 2005/0160297 | A1 * | 7/2005 | Ogawa | G06F 21/31 726/19 |
| 2006/0143477 | A1 | 6/2006 | Stevens, III | |
| 2007/0022299 | A1 * | 1/2007 | Yoshimura | G06F 21/31 713/183 |
| 2007/0174630 | A1 * | 7/2007 | Shannon | G06F 21/31 713/183 |
| 2008/0120079 | A1 * | 5/2008 | Emler | G06F 19/22 703/11 |
| 2010/0054474 | A1 | 3/2010 | Schneider | |
| 2012/0124469 | A1 * | 5/2012 | Nakajima | G06F 3/04817 715/702 |
| 2014/0123274 | A1 * | 5/2014 | Chen | G06F 21/46 726/18 |
| 2014/0137216 | A1 * | 5/2014 | Mohler | G06F 21/45 726/5 |
| 2014/0181260 | A1 * | 6/2014 | Gavade | H04L 65/4084 709/219 |
| 2014/0223189 | A1 * | 8/2014 | Gao | G06F 21/84 713/183 |
| 2014/0223528 | A1 | 8/2014 | Slutsker et al. | |

OTHER PUBLICATIONS

Harkins, Secure Pre-Shared Key (PSK) Authentication for the Internet Key Exchange Protocol (IKE) (RFC6617), An IP.com Prior Art Database Technical Disclosure, Publication Date: Jun. 1, 2012, IP.com No. 000218325, <http://null/IPCOM/000218325>.

Topkara, et al., "Passwords for Everyone: Secure Mnemonic-based Accessible Authentication", Purdue University, Purdue e-Pubs, Computer Science Technical Reports, Department of Computer Science, 2007, Report No. 37-008, Paper 1672, <http://docs.lib.purdue.edu/cstech/1672>.

Xie, et al., "A Class of Authentication Digital Watermarks for Secure Multimedia Communication", IEEE Transactions on Image Processing, vol. 10, No. 11, Nov. 2001, pp. 1754-1764.

Grunin et al., "File and Bit Location Authentication", U.S. Appl. No. 14/658,526, filed Mar. 16, 2015, 32 pages.

IBM Appendix P, list of patents or patent applications treated as related, Feb. 15, 2017, 2 pages.

* cited by examiner

FILE AND BIT LOCATION AUTHENTICATION

TECHNICAL FIELD

The present invention relates generally to authentication, and more particularly to authentication based on information contained in a file.

BACKGROUND

Electronic authentication, also referred to as e-authentication, is the process of establishing confidence in user identities electronically presented to an information system. Authentication is a process closely related to identification. In online environments, the username identifies the user, while the password authenticates that the user is whom the user claims to be. E-authentication presents a technical challenge when this process involves the remote authentication of individual people over a network.

In any authenticated on-line transaction, the verifier is the party that may verify that the claimant has possession and control of the token that verifies his or her identity. A claimant may authenticate his or her identity to a verifier by the use of a token and an authentication protocol. This is called Proof of Possession (PoP). Many PoP protocols are designed so that a verifier, with no knowledge of the token before the authentication protocol run, learns nothing about the token from the protocol run. The verifier and credential service provider (CSP) may be the same entity, the verifier and relying party may be the same entity, or they may all three be separate entities.

SUMMARY

Aspects of the present invention provide an approach for authentication, in accordance with an embodiment of the present invention. In one aspect, a method includes identifying, by one or more computer processors, an account attempting to access content. The method includes identifying, by one or more computer processors, a file including at least authentication information. The method includes identifying, by one or more computer processors, a location of the authentication information within the identified file. The method includes identifying, by one or more computer processors, a length of the authentication information. The method includes identifying, by one or more computer processors, the authentication information in the identified file based at least on the identified location and the identified length of the authentication information. The method includes determining, by one or more computer processors, whether the identified authentication information matches previously submitted authentication information for the identified account attempting to access content requiring authentication.

In another aspect, a computer program product includes program instructions to identify an account attempting to access content. The computer program product includes program instructions to identify a file including at least authentication information. The computer program product includes program instructions to identify a location of the authentication information within the identified file. The computer program product includes program instructions to identify a length of the authentication information. The computer program product includes program instructions to identify the authentication information in the identified file based at least on the identified location and the identified length of the authentication information. The computer program product includes program instructions to determine whether the identified authentication information matches previously submitted authentication information for the identified account attempting to access content requiring authentication.

In yet another aspect, a computer system includes program instructions to identify an account attempting to access content. The computer system includes program instructions to identify a file including at least authentication information. The computer system includes program instructions to identify a location of the authentication information within the identified file. The computer system includes program instructions to identify a length of the authentication information. The computer system includes program instructions to identify the authentication information in the identified file based at least on the identified location and the identified length of the authentication information. The computer system includes program instructions to determine whether the identified authentication information matches previously submitted authentication information for the identified account attempting to access content requiring authentication.

In yet another aspect, a method for deploying a system for authentication includes providing a computer infrastructure being operable to identify, by one or more computer processors, an account attempting to access content. The method includes identifying, by one or more computer processors, a file including at least authentication information. The method includes identifying, by one or more computer processors, a location of the authentication information within the identified file. The method includes identifying, by one or more computer processors, a length of the authentication information. The method includes identifying, by one or more computer processors, the authentication information in the identified file based at least on the identified location and the identified length of the authentication information. The method includes determining, by one or more computer processors, whether the identified authentication information matches previously submitted authentication information for the identified account attempting to access content requiring authentication.

In yet another aspect, identifying a location of the authentication information within the identified file includes identifying, by one or more computer processors, a start bit location for the authentication information located within the identified file.

In yet another aspect, identifying a length of the authentication information includes identifying, by one or more computer processors, a total number of bits that comprise the authentication information.

In yet another aspect, identifying a length of the authentication information includes identifying, by one or more computer processors, a total number of characters that comprise the authentication information.

DETAILED DESCRIPTION

Embodiments of the present invention recognize that it may be desirable to store authentication information within a file. If the authentication information is stored within a file, then the only part that has to be recalled to grant access may be the start location and the size of that authentication information. Embodiments of the present invention recognize that storing authentication information within a file can lead to larger, more varied authentication information, and therefore more secure authentication methods. Embodiments of the present invention provide enhanced security by allowing the file or files used for authentication to change. Embodiment of the current invention further provides for authentication files to be created from anew, or for changes within the authentication file.

Figure 1:
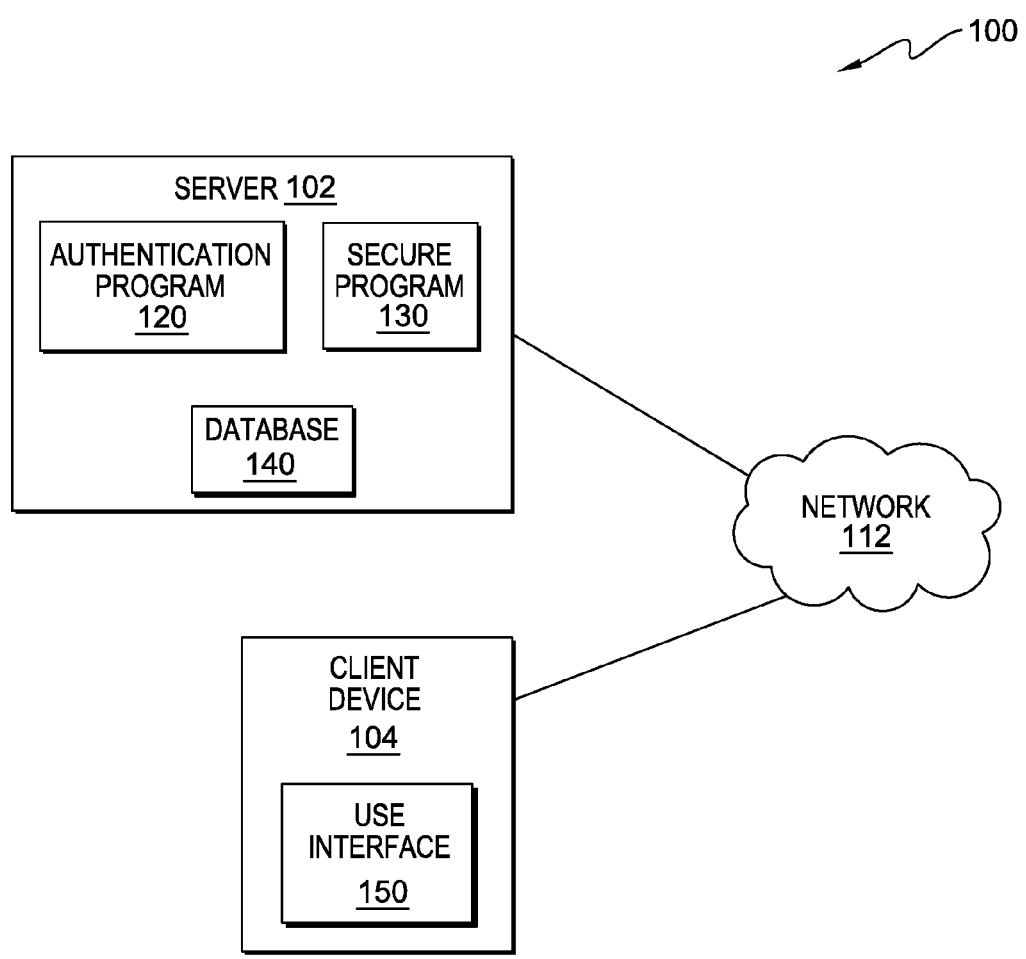
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102 and client device 104, all interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 receives and verifies authentication information provided by a user of a client device, another computing device, or any other method known by a person skilled in the art. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with client device 104 via network 112. In another embodiment, server 102 represents a computing system utilizing clustered computers and components to act as a single pool of seamless resources. Server 102 may include components as depicted and described in further detail with respect to FIG. 4, in accordance with embodiments of the present invention. Server 102 includes authentication program 120, secure program 130, and database 140.

In depicted distributed data processing environment 100, authentication program 120 resides on server 102 and stores and verifies authentication information. In various embodiments, authentication program 120 receives information from a computing device (e.g., client device 104) containing data pertaining to a specific identification, also referred to herein as authentication information. In one example, a specific identification may be a client user name associated with a company or individual. In another example, the specific identification may be an IP address, a computing device's serial number, or any other method known in the art for identifying a user or device. In various embodiments, authentication program 120 receives a password and/or other authentication method, which is used to verify that the specific identification is the actual user or machine that is trying to access the secure connection. In one embodiment, authentication program 120 verifies that the request to access the secure connection, secure information, secure program, secure database (e.g., secure program 130), etc. has a matching specific identification and password. The priorities are based upon the user's responses to recent activities and relationship importance as established on social media websites. Authentication program 120 is depicted and described in further detail with respect to FIGS. 2 and 3.

In the depicted embodiment, database 140 resides on server 102. In another embodiment, database 140 may reside elsewhere in distributed data processing environment 100, such as within server 102, client device 104, or independently as a standalone database that is capable of communicating with server 102 and/or client device 104 via network 112. A database is an organized collection of data. Database 140 is implemented with any type of storage device capable of storing data that is accessed and utilized by server 102 and client device 104, such as a database server, a hard disk drive, or a flash memory. In other embodiments, database 140 represents multiple storage devices within server 102. Database 140 stores information, such as user names, accounts, and passwords. In various other embodiments, database 140 may contain authentication information, such as login names, the name of a user, the location of a user, an internet protocol (IP) address, start bit locations for passwords, total number of bits or characters that make up a password, a file containing a password, or any other authentication information known in the art. In an example, database 140 stores a user name and password created by a user of client device 104 to access an authentication protected program, database, file, etc., such as secure program 130. In another example, all authentication information is stored and identified by authentication program 120.

In depicted distributed data processing environment 100, secure program 130 resides on server 102 and is a generic program representing any program that may require some authentication to gain access. In some embodiments, secure program 130 and authentication program 120 may be joined as a singular program. In other embodiments, secure program 130 and authentication program 120 may operate as separate program. In an embodiment, secure program 130 and authentication program 120 may operate on separate computing devices; however, secure program 130 and authentication program 120 can communicate via network 112.

In the depicted embodiment, client device 104 is one or more of a desktop computer, a laptop computer, a tablet computer, a specialized computer server, a smart phone, or any programmable electronic device capable of communicating with server 102 via network 112 and with various components and devices within distributed data processing environment 100. In general, client device 104 represents any programmable electronic device or combination of programmable electronic devices capable of executing machine readable program instructions and communicating with other computing devices via a network, such as network 112. Client device 104 may include components as depicted and described in further detail with respect to FIG. 4, in accordance with embodiments of the present invention. In an embodiment, client device 104 sends authentication information via network 112 to authentication program 120 and is either granted access to secure program 130 or denied access to secure program 130. In an example, client device 104 sends authentication information to authentication program 120 which matches the authentication information for client device 104 which is stored in database 140 and client device 104 is granted access to secure program 130.

In the depicted embodiment, user interface (UI) 150 resides on client device 104. In an embodiment, received communications and information may be displayed to a user of client device 104 through user interface 150, and messages and instruction may be received from the user through user interface 150. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and a mouse, through graphical icons and visual indicators, such as secondary notation, as opposed to text-based interfaces, typed command labels, or text navigation. In computing, GUIs were introduced in reaction to the perceived steep learning curve of command-line interfaces, which require commands to be typed on the keyboard. The actions in GUIs are often performed through direct manipulation of the graphics elements.

Figure 2:
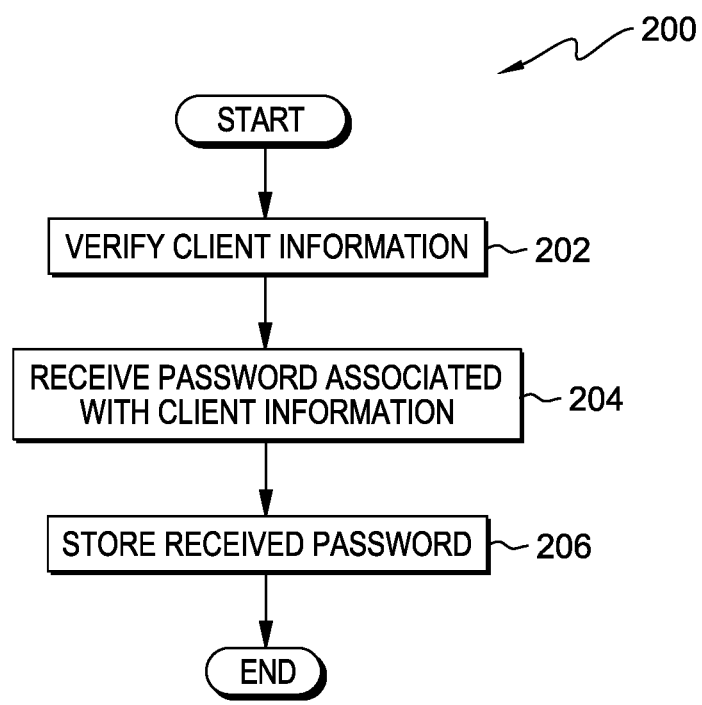
FIG. 2 is a flowchart depicting operational steps of a program, in accordance with an embodiment of the present invention.

FIG. 2 depicts flowchart 200, showing a function of authentication program 120, in accordance with an embodiment of the present invention. Authentication program 120 operates on server 102 and creates or modifies user names, passwords, client information, etc. In various embodiments, the authentication information for authentication program 120 may be created for the first time to set up an initial account or add additional accounts. In other embodiments, the authentication information for authentication program 120 may be modified as not to have the same authentication information for extended periods of time. In one embodiment, a user initiates the operational steps of authentication program 120 the first time a user of a client device (e.g., client device 104) sets up an account with authentication program 120. In another embodiment, authentication program 120 may initiate the operational steps of authentication program 120 every 90 days as to update information and utilize a new password. In yet another embodiment, authentication program 120 may initiate when a client device (e.g., client device 104) attempts to access a secure program, file, database, etc. (e.g., secure program 130) and no username has been created for access to the secure program, file, database, etc.

Authentication program 120 verifies client information (step 202). In various embodiments, authentication program 120 verifies client information received from a client device (e.g., client device 104). In an embodiment, a user of client device 104 may try to set or change a password for authentication program 120, thereby triggering authentication program 120 to verify the client information. In some examples, client information may include a user name, a company name, a location of the user or the computer via GPS or internet protocol (IP) address, correct answers to questions, passwords, or any other method currently know by a person skilled in the art. In an example, authentication program 120 sends a prompt to client device 104 to update a password associated with client device 104. Authentication program 120 verifies the client information received from client device 104 to determine that client device 104 is a valid user of an account for secure program 130. In another example, authentication program 120 receives a request from client device 104 to create a new account for secure program 130. In this example, authentication program verifies that all necessary client information is gathered to create an account, such as a username, date of birth, location, etc.

Authentication program 120 receives a password associated with the verified client information (step 204). In various embodiments, authentication program 120 receives a password associated with the client information from a client device (e.g., client device 104). In an example, authentication program 120 may have specific criteria that a password must have, which can be set by administrators of authentication program 120 and/or secure program 130, such as number of characters, types of characters, etc. In some examples, a password may include a file that is received by authentication program 120. In this example, the file will have a password contained somewhere within, such as a specific block of a spreadsheet. Authentication program 120 would also receive a start bit location for the password in the file, and the length of the password. In an example, a start bit location is the bit location at which the password begins. To further the example, a start bit location of 15 may be given indicating that the password begins at the $15^{th}$ bit in the file.

In one embodiment, authentication program 120 may receive a file that contains a binary string containing thousands of characters. In this embodiment, authentication program 120 also receives information pertaining to the start bit location and the number of bits or characters of the password (e.g., start bit 5, number of bits 250). In this example, the user of client device 104 would not have to memorize a password for future access to a secure program, database, etc., but rather just upload the binary string and remember the start bit is 5, and the number of bits is 250. Receiving a password contained in a file is advantageous as embedding a password in a file allows for better security if a database is breached because the password is not explicitly spelled out.

Authentication program 120 stores the received password (step 206). In various embodiments, authentication program 120 stores the received authentication information associated with the client information in a database (e.g., database 140). In an example, authentication program 120 stores a password received from client device 104 in database 140. Authentication program 120 may store the password and associate the stored password with a user name that was created or modified by a user of client device 104. In another example, authentication program 120 may store all information pertaining to a username together in a database, such as database 140. In various embodiments, authentication program 120 may only store authentication information, such as a password associated with a user account.

Figure 3:
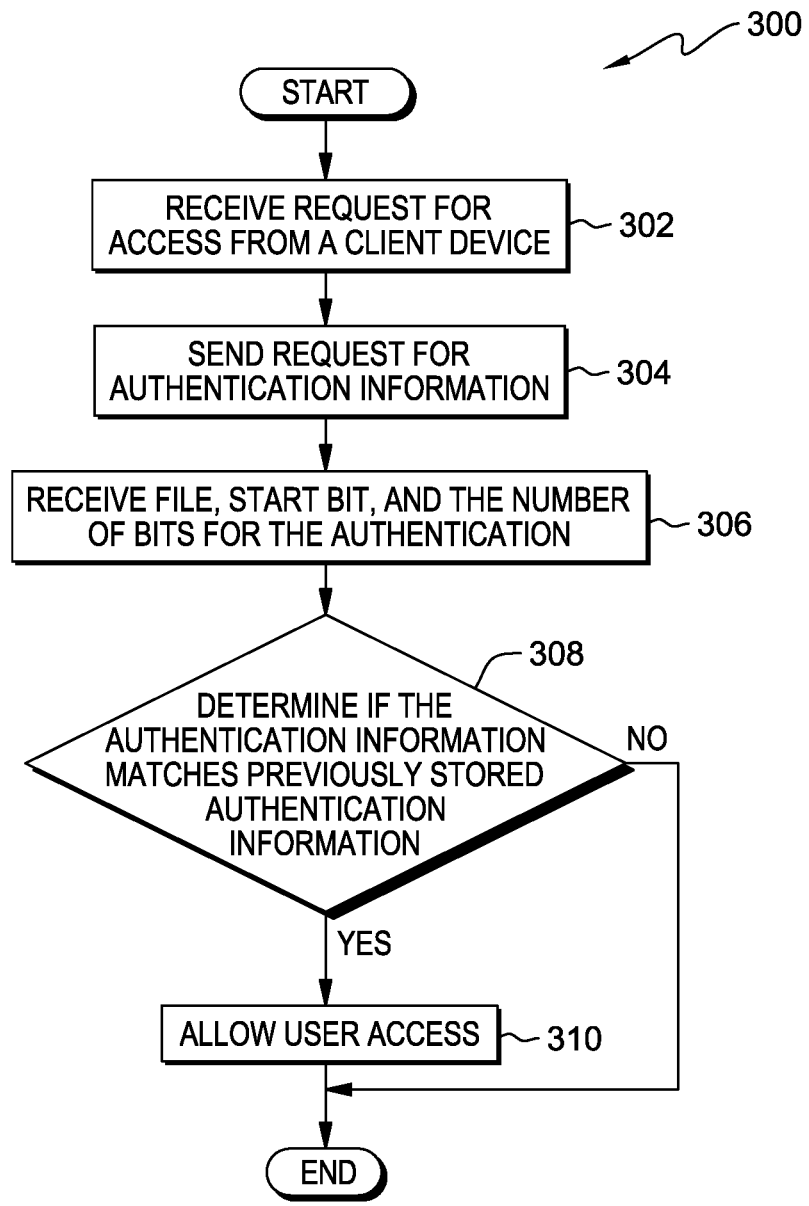
FIG. 3 is a flowchart depicting operational steps of a program, in accordance with an embodiment of the present invention.

FIG. 3 depicts flowchart 300, showing a function of authentication program 120, in accordance with an embodiment of the present invention. Authentication program 120 operates on server 102 and determines if the authentication is valid for an account. In various embodiments the operational steps of flowchart 300 for authentication program 120 may begin after authentication program 120 has completed step 206 for a client. In other embodiments, the operational steps of flowchart 300 for authentication program 120 may begin each time access is requested to secure information which authentication program 120 oversees. In yet other embodiments, the operational steps of flowchart 300 for authentication program 120 may begin after a secure program, a secure database, a secure file, etc. request an authentication check by authentication program 120 before granting access.

Authentication program 120 receives a request for access from a client device (step 302). In various embodiments, authentication program 120 receives a request for access to an authentication requiring program, database, file, etc. (e.g., secure program 130). In an example, authentication program 120 receives a request from client device 104 to access secure program 130. In another example, authentication program 120 may receive a request to access authentication program 120, or a program, database, etc. located on another computing device (not depicted), but the program, database, file, etc., is managed by authentication program 120.

Authentication program 120 sends a request for authentication information (step 304). In some embodiments, authentication program 120 sends a request for authentication information to the computing device that sent the initial request for access to the secure program, database, file, etc. In an example, authentication program 120 sends client device 104 a request for authentication information, such as a password. In other embodiments, authentication program 120 may determine which client account, username, customer number, etc. is trying to access and sends the client device that is registered to the account a request for authentication information. In an example, client device 104 requests access to secure program 130. Authentication program 120 determines that the account client device 104 is trying to access is registered to another client device (not depicted), and authentication program 120 sends a request for authentication information to the other client device. In various embodiments, authentication program 120 sends a request to a client device that has multiple query boxes, such as a space to upload a file, a space for a start bit location, and a space to input the total number of bits or characters for the authentication. In some embodiments, authentication program 120 may require the identity of a user via a user id.

Authentication program 120 receives a file, a start bit location, and the number of bits for the authentication (step 306). In some embodiments, authentication program 120 receives a file, a start bit location, and the number of bits or characters for the authentication from a client device (e.g., client device 104) trying to access a secure program, database, file, etc. (e.g., secure program 130). In an example, authentication program 120 receives a spreadsheet file from client device 104. Authentication program 120 also receives a start bit location of the authentication (e.g., password) in the file and a total number of bits for the authentication in the file from client device 104. In one embodiment, authentication program 120 may not receive a file but rather a file will have been selected by the user of a client device (client device 104) which was previously submitted and stored in database 140. Receiving a file for authentication is advantageous because receiving a file is more secure than receiving a password as the file may contain more than just a password and therefore not allow access to authentication required information alone. Receiving a start bit location and a total number of bits for authentication is advantageous because a user does not need to remember a password but rather just the start bit number and the total number of bits, thereby allowing for a much more random and elaborate password.

Authentication program 120 determines if the authentication information matches previously stored authentication information (decision 308). In various embodiments, authentication program 120 determines if the received authentication information matches information stored in a database (e.g., database 140). In an example, authentication program 120 receives a file from client device 104. In this example, the file is a spreadsheet. In this example, the file should contain the authentication information that corresponds to the authentication information that was created or updated by authentication program during the operational steps of flowchart 200. The start bit location allows authentication program 120 to know where the authentication information in the file begins. The total number of bits or characters enables authentication program 120 to determine the length of the authentication information (e.g., a password). In another example, a password has been previously stored by authentication program 120 during the operational steps of flowchart 200, which allows access to the information that a client device is requesting. Authentication program 120 receives a text document that may contain 5000 characters with a password being comprised of the characters at some location in the file. Authentication program 120 uses the start bit location, which indicates the password starts at character 1,700, and the total number of bits or characters, which indicates the password is 8 characters long, to identify which characters in the text document are the password.

In some embodiments, the authentication information may contain a file which may not have characters, but rather colors, shapes pictures, or some other form of differentiation. In an example, if the file includes shapes and is not a text or spreadsheet document, the data is still binary byte data, such as an image.

In some embodiments, authentication program 120 does not need to receive the same file to determine if the authentication information received from a client device matches previously stored authentication information. In an example, client device 104 may have 5 different files, each of which have the same characters at the same start bit location and the same total number of characters. In another example, authentication program 120 may receive a file that has the same password characters in a different start bit location. For example, file one may have "password" starting at bit 5, and file two may have "password" starting at bit 50. In this example, both of these files could match the authentication information as long as the correct start bit location is provided by client device 104 in step 306.

In some embodiments, authentication program 120 may execute a hash algorithm against the input string (e.g., password). In these embodiments, authentication program 120 then compares the hash from the received password against the hash of the original password stored in the database.

If authentication program 120 determines that the authentication information matches previously stored authentication information (yes branch, decision 308), then authentication program 120 allows user access (step 310). In an embodiment, authentication program 120 determines that the authentication information received from the client device (e.g., client device 104) matches the authentication information previously stored (e.g., information from database 140) for the secure program, database, etc. (e.g., secure program 130) and allows the client device to access the secure program, database, file, etc. (e.g., secure program 130). In an example, the indicated bits in the file received by authentication program 120 match a password previously submitted by client device 104 to grant access to a client account of secure program 130. Authentication program 120 may make the matching determination based on information that is stored in a database, such as database 140 or another database either on the same computing device or another computing device. In this example, authentication program 120 allows client device 104 access to the client account in secure program 130. In various embodiments, authentication program 120 may also determine if the file matches a previously submitted file along with authentication information in the file.

If authentication program 120 determines that the authentication information does not match previously stored authentication information (no branch, decision 308), then authentication program 120 ends. In an embodiment in which authentication program 120 determines that the authentication information does not match previously stored authentication information, such as authentication information in database 140, then authentication program 120 ends. In another embodiment, if authentication program 120 determines that the authentication information does not match previously stored authentication information, then authentication program 120 may proceed to step 304. In various embodiments, if authentication program 120 determines that the authentication information does not match previously stored authentication information, then authentication program 120 may alert the user of that account that is trying to be accessed, or determining that the amount of times that the authentication match has failed has reached a threshold, authentication program 120 may lock the account.

Figure 4:
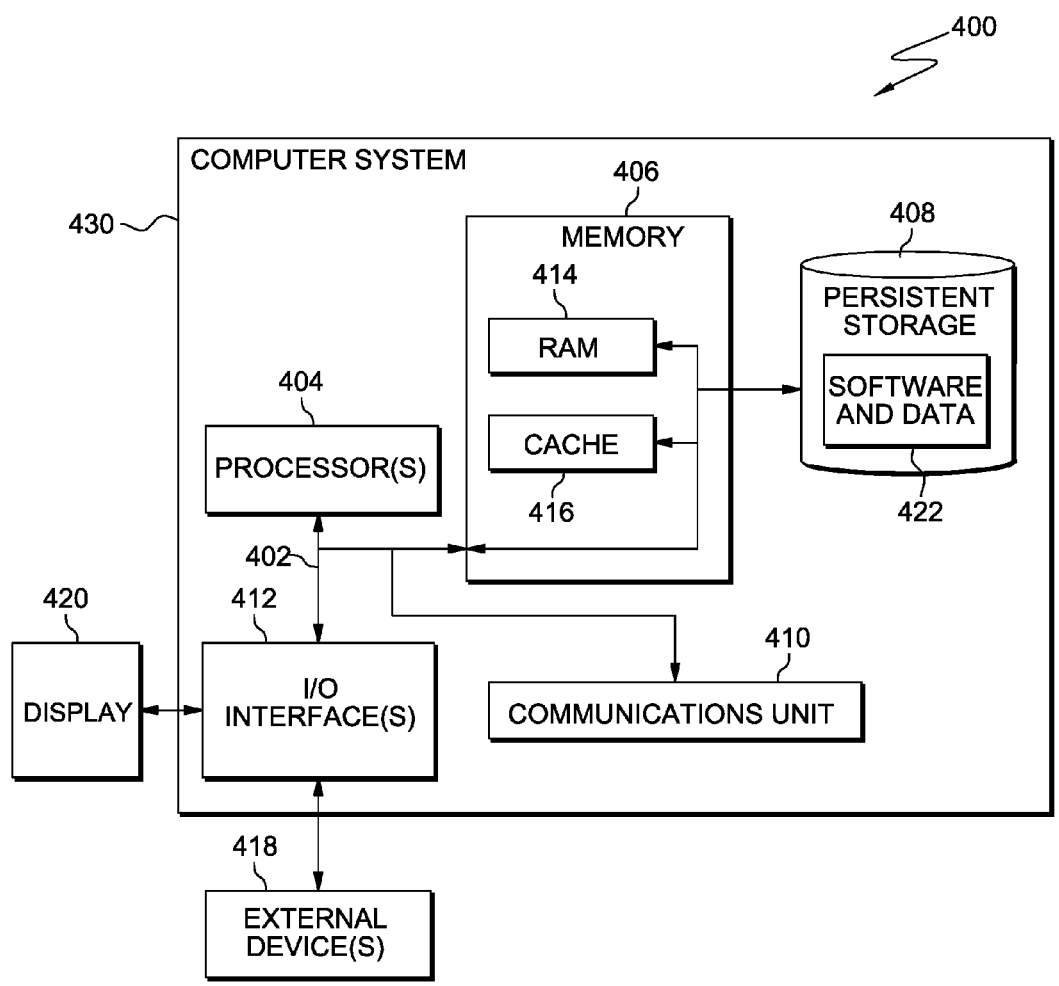
FIG. 4 depicts a block diagram of components of a computing device, in accordance with an embodiment of the present invention.

FIG. 4 depicts a block diagram of components of computer 400, which is representative of server 102 and client device 104, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media. Software and data 422 are stored in persistent storage 408 for access and/or execution by processor(s) 404 via one or more memories of memory 406. With respect to server 102, software and data 422 represents authentication program 120, secure program 130, and database 140. With respect to client device 104, software and data 422 represents user interface 150.

In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data 422 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In another embodiment, the invention provides a method that performs the process of the invention on a subscription, advertising, and/or fee basis. That is, a service provider, such as a Solution Integrator, could offer to provide authentication verification by receiving files, start bit locations, and a total number of bits. In this case, the server provider can create, maintain, and support, etc., a computer infrastructure, such as computer system 430 (FIG. 4) that performs the processes of the invention for one or more consumers. In return, the service provider can receive payment form the consumer(s) under a subscription and/or fee agreement and/or the service provider can receive payment from the sale of advertising content to one or more third parties.

In still another embodiment, the invention provides a computer-implemented method for authenticating access to secure information. In this case, a computer infrastructure, such as computer system 430 (FIG. 4), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 430 (FIG. 4) from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authentication, the method comprising:
   identifying, by one or more processors, a location of authentication information within a file that includes authentication information associated with an account attempting to access content by identifying a start bit location for the authentication information;
   identifying, by one or more processors, a length of authentication information from the account attempting to access content by identifying a total number of characters that comprise the authentication information;
   determining, by one or more computer processors, whether the identified start bit location for authentication information and the length of authentication information matches previously submitted authentication information for the account attempting to access content requiring authentication;
   responsive to determining the identified start bit location for authentication information and the length of authentication information does not match previously submitted authentication information for the account attempting to access the content, locking the content from access, based, at least in part, on a predetermined number of times that the identified authentication information does not match previously submitted authentication information for the identified account;
   responsive to determining the identification authentication information does not match previously submitted authentication information for the identified account, determining an owner of the content requiring authentication; and
   responsive to determining the owner of the content, alerting, by one or more computer processors, the owner of the content via a network.

2. The method of claim 1, further comprising:
   in response to determining that the authentication information matches the previously submitted authentication information, granting, by one or more computer processors, access to content requiring authentication.

3. The method of claim 1, wherein identifying a length of the authentication information comprises:
   identifying, by one or more computer processors, a total number of bits that comprise the authentication information.

4. The method of claim 1, wherein authentication information comprises information which has been previously submitted during creation of the account.

5. The method of claim 1, wherein authentication information comprises a specific string of characters that is presented in a defined order to be granted access to the account.

6. A computer program product for authentication, the computer program product comprising:
   one or more non-transitory computer readable storage media and program instructions stored on the one or more computer readable storage media, wherein the computer readable storage media are not transitory signals per se, the program instructions comprising:
   program instructions to identify a location of authentication information within a file that includes authentication information associated with an account attempting to access content by identifying a start bit location for the authentication information;
   program instructions to identify a length of authentication information from the account attempting to access content by identifying a total number of characters that comprise the authentication information;
   program instructions to determine whether the identified start bit location for authentication information and the length of authentication information matches previously submitted authentication information for the account attempting to access content requiring authentication;
   responsive to determining the identified start bit location for authentication information and the length of authentication information does not match previously submitted authentication information for the account attempting to access the content, program instructions to lock the content from access, based, at least in part, on a predetermined number of times that the identified authentication information does not match previously submitted authentication information for the identified account;
   responsive to determining the identification authentication information does not match previously submitted authentication information for the identified account, determining an owner of the content requiring authentication; and
   responsive to determining the owner of the content, alerting, by one or more computer processors, the owner of the content via a network.

7. The computer program product of claim 6, further comprising program instructions to:
   in response to program instructions to determine that the authentication information matches the previously submitted authentication information, grant access to content requiring authentication.

8. The computer program product of claim 6, wherein program instructions to identify a length of the authentication information comprises program instructions to:
   identify a total number of bits that comprise the authentication information.

9. The computer program product of claim 6, wherein authentication information comprises information which has been previously submitted during creation of the account.

10. The computer program product of claim 6, wherein authentication information comprises a specific string of characters that is presented in a defined order to be granted access to the account.

11. A computer system for authentication, the computer system comprising:
    one or more computer processors;
    one or more computer readable storage media;
    program instructions stored on the computer readable storage media for execution by at least one of the one or more computer processors, the program instructions comprising:
    program instructions to identify a location of authentication information within a file that includes authentication information associated with an account attempting to access content by identifying a start bit location for the authentication information;
    program instructions to identify a length of authentication information from the account attempting to access content by identifying a total number of characters that comprise the authentication information;

program instructions to determine whether the identified start bit location for authentication information and the length of authentication information matches previously submitted authentication information for the account attempting to access content requiring authentication;

responsive to determining the identified start bit location for authentication information and the length of authentication information does not match previously submitted authentication information for the account attempting to access the content, program instructions to lock the content from access, based, at least in part, on a predetermined number of times that the identified authentication information does not match previously submitted authentication information for the identified account;

responsive to determining the identification authentication information does not match previously submitted authentication information for the identified account, determining an owner of the content requiring authentication; and responsive to determining the owner of the content, alerting, by one or more computer processors, the owner of the content via a network.

12. The computer system of claim 11, further comprising program instructions to:
in response to program instructions to determine that the authentication information matches the previously submitted authentication information, grant access to content requiring authentication.

13. The computer system of claim 11, wherein program instructions to identify a length of the authentication information comprises program instructions to:
identify a total number of bits that comprise the authentication information.

14. The computer system of claim 11, wherein authentication information comprises information which has been previously submitted during creation of the account.

* * * * *